Nov. 2, 1926.

1,604,998

A. R. RUTTER

CONSTANT SPEED MOTOR

Filed Jan. 26, 1921

WITNESSES:
H. J. Shelhamer
J. M. Procter

INVENTOR
Argyle R. Rutter
BY
Wesley G. Carr
ATTORNEY

Patented Nov. 2, 1926.

1,604,998

UNITED STATES PATENT OFFICE.

ARGYLE R. RUTTER, OF PITTSBURGH, PENNSYLVANIA, ASSIGNOR TO WESTINGHOUSE ELECTRIC & MANUFACTURING COMPANY, A CORPORATION OF PENNSYLVANIA.

CONSTANT SPEED MOTOR.

Application filed January 26, 1921. Serial No. 439,955.

My invention relates to motors and particularly to constant-speed induction motors. One object of my invention is to provide an induction motor that shall have a substantially constant speed, irrespective of the change in applied voltage.

Another object of my invention is to provide a motor of the above indicated character that shall have such constant speed that it may be used for indicating lapsed time.

Another object of my invention is to provide a motor of the above indicated character that shall have a relatively high torque.

A further object of my invention is to provide a device of the above indicated character that shall be compact in structure, inexpensive to construct and effective in its operation.

In practicing my invention, I provide a magnetizable core member having a central and side legs, separated, at one end, by air gaps. A main potential winding is disposed around the central member, and an auxiliary winding is disposed around the central and one of the side members and the air gap therebetween. The auxiliary winding is connected in series with a secondary winding which is also disposed around the central leg of the core member. An armature is disposed adjacent the outer ends of the legs and is adapted to be actuated when the main winding is energized. Since the auxiliary winding is inductively related to the main winding, it will be readily seen that the drooping characteristics of the registration curve, by reason of an increase in voltage, will be compensated for to thus cause the motor to operate at a constant speed, irrespective of the change in the applied voltage. A motor of this character is particularly useful for indicating lapse of time as it is not affected in its speed by changes in the applied voltage. By reason of the fact that the auxiliary winding surrounds only one pole of the magnet, a relatively high torque is obtained.

Figure 1:
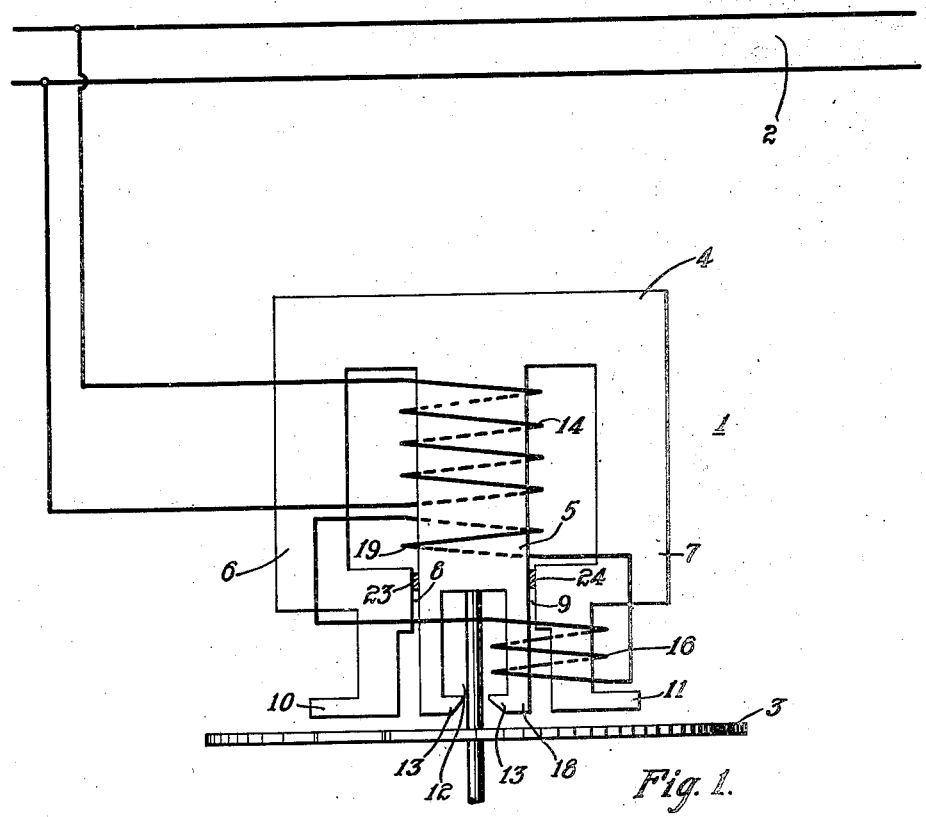
Figure 2:
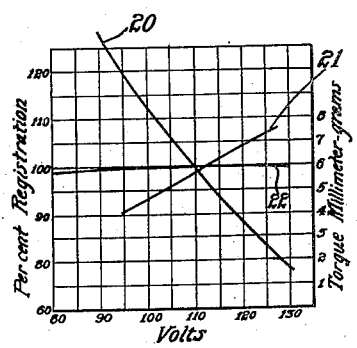

Figure 1 of the accompanying drawings is a diagrammatic view of a motor embodying my invention, and Fig. 2 is a diagram illustrating the shunt damping, speed and torque characteristics of the motor for various applied voltages.

A motor 1 is operatively connected to an alternating-current circuit 2 and is adapted to actuate its armature 3 at a substantially constant speed, irrespective of the change in voltage on the circuit 2.

The motor 1 comprises a magnetizable core member 4 having a central leg 5 and two side legs 6 and 7, which are separated from the central leg, at one end, by air gaps 8 and 9 and which have horns 10 and 11 extending outwardly at the free ends thereof. A slot 12 is provided in the central member 5 which is partially closed by horns 13 that extend from the sides thereof. A main winding 14 is disposed around the central member 5 and is connected in shunt to the circuit 2. An auxiliary winding 16 is disposed around the portion 18 of the central member 5 and the side member 7. A secondary winding 19 is disposed around the central member 5 and is connected in series with the winding 16.

If the winding 16 is provided with constant current and is disconnected from the winding 19, the speed of the armature 3 will decrease with an increase in applied voltage to the winding 14. This is caused by reason of the fact that the torque of an induction motor of this character is directly proportional to the product of constants multiplied by the two co-operating fluxes and inversely proportional to the sum of the squares of the fluxes. In other words, the retarding action on the armature varies at a greater rate for a change in voltage than the increased torque caused by the change in voltage. In view of this, the winding 16 is inductively related to the winding 14 in order that, when the voltage applied to the winding 14 increases, the current in the winding 16 will also increase to thus compensate for the increased retardation incident to the increase in voltage. Magnetizable wedges 23 and 24 may be disposed in the air gaps 8 and 9 to effect a proper division of the flux of the shunt winding 14 when the applied voltage is increased to thus assist in compensating for the change in speed upon a change in applied voltage. However, the wedges may be omitted and the air gaps made of such characteristics as to obtain the desired division of flux.

It has been found that, with a motor of this character, the deviation from constant speed is only three-tenths of one percent with a change in voltage over the normal range. This is clearly shown in the diagram of Fig. 2 of the drawings of which line 20 indicates the torque or shunt damping curve of the motor if the same were responsive only to the winding 14 with constant current on the winding 16, the line 21 represents the torque of the motor and the line 22 represents the speed-characteristic or registration curve of the motor when the windings are inductively connected. Only one auxiliary winding is used because the use of a short-circuited winding on one pole increases the torque of the motor.

My invention is intended for use in indicating lapsed time and, by reason of its small structure, it is particularly useful in connection with demand meters for indicating lapsed time. However, the invention may have various applications, and various changes may be made therein without departing from the spirit and scope of the invention, as set forth in the appended claims.

I claim as my invention:—

1. An induction motor comprising a core member having a central leg and two side legs separated from the central leg by air gaps, an armature disposed adjacent the legs, a main winding surrounding the central leg, an auxiliary winding surrounding the side leg and a portion of the central leg, and means for inductively connecting the auxiliary winding to the main winding.

2. A constant-speed induction motor comprising a magnetizable core having a central member and side members separated therefrom, at one end, by air gaps, a main winding surrounding the central member, an auxiliary winding surrounding the separated portions of the central and one side member, and a secondary winding surrounding the central member and operatively connected to the auxiliary winding.

3. A constant-speed induction motor comprising a magnetizable core having a central member and side members separated therefrom, at one end, by air gaps, a main winding surrounding the central member, an auxiliary winding surrounding the separated portions of the central and one side member and the air gaps therebetween, and means for inductively connecting the auxiliary winding to the main winding.

4. A constant-speed induction motor comprising a magnetizable core having a central member and side members separated therefrom, at one end, by air gaps, a main winding surrounding the central member, an auxiliary winding surrounding the separated portions of the central and one side member, and a secondary winding inductively related to the main winding and operatively connected to the auxiliary winding.

5. An electric motor comprising a magnetizable core member, an armature, a main energizing winding for the core member, a secondary winding inductively deriving its operating current from the main winding, and a tertiary winding energized by the secondary winding for energizing said core member to affect the armature in opposition to the effect of the main winding thereon.

6. In an alternating-current circuit, the combination with a magnetizable core member, an armature disposed adjacent to the poles thereof, and a main energizing winding for the core member disposed in shunt relation to the circuit, of a secondary winding deriving its operating current inductively from the main winding, and a tertiary winding connected to the secondary winding and affecting said armature through said core member in opposition to the effect of the main winding to actuate the armature at a constant speed irrespective of voltage changes in the main winding.

7. An electric motor comprising a magnetizable core member, an armature, a main energizing winding for the core member, and a secondary circuit inductively deriving its operating current from the circuit of the main winding and including a plurality of windings associated with said core member for actuating the armature at a constant speed irrespective of voltage changes in the main circuit.

8. In an alternating-current circuit, the combination with a magnetizable core member, an armature therefor, and a main winding operatively connected to the circuit for energizing the core member, of a secondary circuit including a secondary winding inductively deriving its operating current from the main winding and a tertiary winding connected to said secondary winding and affecting said core member to compensate for the damping action of an increase in applied voltage and to cause the armature to have a constant speed, irrespective of changes in the voltage applied to the circuit.

In testimony whereof, I have hereunto subscribed my name this 20th day of January 1921.

ARGYLE R. RUTTER.

Certificate of Correction.

It is hereby certified that in Letters Patent No. 1,604,998, granted November 2, 1926, upon the application of Argyle R. Rutter, of Pittsburgh, Pennsylvania, for an improvement in "Constant-Speed Motors," an error appears in the printed specification requiring correction as follows: Page 1, lines 82 and 83, strike out the words "constants multiplied by" and insert the same to follow after the word "of" in line 84; and that the said Letters Patent should be read with this correction therein that the same may conform to the record of the case in the Patent Office.

Signed and sealed this 30th day of November, A. D. 1926.

[SEAL.]

M. J. MOORE,
*Acting Commissioner of Patents.*